(12) United States Patent
Reuteler

(10) Patent No.: US 8,070,235 B2
(45) Date of Patent: Dec. 6, 2011

(54) RIM AND METHOD FOR PRODUCING A RIM

(75) Inventor: Andreas Reuteler, Biel (CH)

(73) Assignee: DT Swiss, Inc., Grand Junction, CO (US)

( * ) Notice: Subject to any disclaimer, the term of this patent is extended or adjusted under 35 U.S.C. 154(b) by 83 days.

(21) Appl. No.: 12/109,218

(22) Filed: Apr. 24, 2008

(65) Prior Publication Data

US 2008/0265658 A1 Oct. 30, 2008

(30) Foreign Application Priority Data

Apr. 24, 2007 (DE) .................. 10 2007 019 587

(51) Int. Cl.
*B60B 21/00* (2006.01)

(52) U.S. Cl. ......... 301/95.103; 301/64.702; 301/64.706; 301/95.104

(58) Field of Classification Search ............. 301/64.706, 301/95.102, 95.103, 95.104, 95.106, 95.107, 301/95.108, 95.11, 64.701, 64.702, 64.703, 301/95.101; 29/894.353, 894.354
See application file for complete search history.

(56) References Cited

U.S. PATENT DOCUMENTS

| | | | |
|---|---|---|---|
| 530,990 A | 12/1894 | Goodrich | |
| 1,442,242 A * | 1/1923 | Atwood | 301/63.102 |
| 1,938,862 A | 12/1933 | Roe | |
| 2,126,222 A * | 8/1938 | Schwinn | 301/95.106 |
| 4,030,754 A | 6/1977 | Merlette | |
| 4,832,414 A * | 5/1989 | Jones | 301/64.703 |
| 5,045,261 A * | 9/1991 | Weeks | 264/108 |
| 5,769,584 A | 6/1998 | Claes | |
| 5,975,645 A | 11/1999 | Sargent | |
| 6,347,839 B1 * | 2/2002 | Lew et al. | 301/95.102 |
| 6,761,847 B2 | 7/2004 | Meggiolan | |
| 7,258,402 B2 * | 8/2007 | Meggiolan | 301/95.103 |
| 7,614,706 B2 * | 11/2009 | Meggiolan et al. | 301/95.102 |
| 7,658,007 B2 * | 2/2010 | Melbinger | 29/894.35 |
| 7,858,011 B2 * | 12/2010 | Reuteler | 264/258 |
| 2004/0026986 A1 | 2/2004 | Jager | |
| 2004/0227393 A1 | 11/2004 | Meggiolan | |
| 2005/0062337 A1 * | 3/2005 | Meggiolan et al. | 301/95.102 |
| 2007/0194619 A1 * | 8/2007 | Colegrove et al. | 301/95.101 |
| 2007/0205654 A1 * | 9/2007 | Denk et al. | 301/95.102 |

FOREIGN PATENT DOCUMENTS

DE 3814441 * 11/1988
EP 1 231 077 A2 8/2002

* cited by examiner

*Primary Examiner* — Russell Stormer
(74) *Attorney, Agent, or Firm* — Greer, Burns & Crain, Ltd.

(57) ABSTRACT

A rim and a method of producing a rim for bicycles and the like includes a rim body and a rim base provided thereon and lateral rim flanks provided with rim flanges. The rim flanges include a fibrous composite material having at least one fiber layer. The rim flanges include inwardly overhanging bulges of squashed fiber layers between which a tire can be accommodated at the rim body.

12 Claims, 6 Drawing Sheets

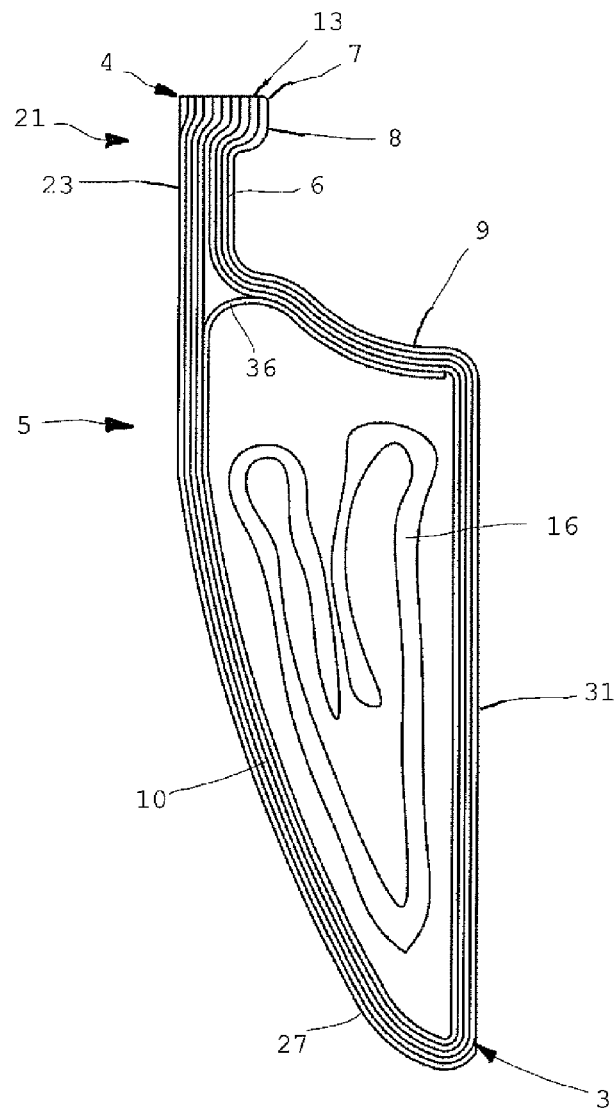
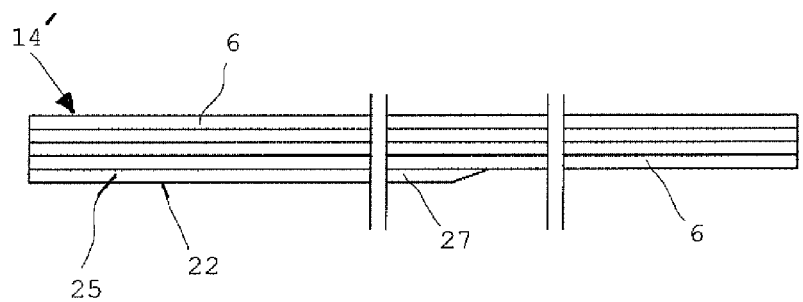
Fig. 4
Fig. 5

RIM AND METHOD FOR PRODUCING A RIM

BACKGROUND

The invention relates to a rim provided with rim flanges and a method for producing such a rim, in particular of a fibrous composite material.

In the field of amateurs in particular many bicycle rims comprise rim flanges between which a tire can be attached to the rim. In the field of professional cycling and again in the field of amateurs, the weight and the stress tolerance of the components are a decisive factor since quality-conscious users set great store by high-quality, lightweight components.

In the prior art, rims of fiber-reinforced plastics have been disclosed by means of which the rims may be reduced in weight. Concurrently these rims, while being reduced in total weight, achieve a stability comparable to that of metal rims. One drawback of rims of fiber-reinforced materials is the complicated production since many production steps must be performed manually which increases the costs.

Many rims are produced by way of positioning resin-impregnated woven fiber mats in a mold wherein after curing, finishing is required at least in the region of the rim flanges to give the rim flanges the desired shape.

For example EP 1 231 077 B 1 has disclosed a method for producing a rim for a bicycle and a corresponding apparatus for producing a rim according to which, to produce a hollow rim provided with rim flanges, multiple layers of a structural woven fiber which includes a plastic matrix, are successively, one by one applied on the inner part of a mold. The applied, predetermined quantity of layers forms the inner wall, the outer wall, the two side walls, and the rim flanges of the rim. Subsequently an inflatable bag is applied on the layers. A predetermined quantity of layers is folded back on the bag. A core is positioned on the folded back, first layers, the remaining layers being folded on top. After closing the mold, said mold is heated up to an increased temperature to generate reticulation of the plastic matrix. The rim is removed from the mold, overhanging rim flanges are trimmed and in a subsequent mechanical, cutting machining step given the desired shape.

A drawback of the known method is the high extent of work in producing the rim.

Therefore it is the object of the present invention to provide a rim and a method for producing a rim by means of which a lightweight though robust rim is provided while the production steps required are reduced.

SUMMARY

Further advantages and features of the present invention can be taken from the description of the embodiments.

The rim according to the invention is in particular provided to be used with bicycles and the like and comprises at least a rim body having a rim base and lateral rim flanks provided with rim flanges. At least the rim flanges consist at least in part of a fibrous composite material having at least one fiber layer which is embedded in a plastic matrix. The rim flanges comprise inwardly overhanging bulges of squashed fiber layers between which a tire can be attached to the rim body.

The invention has many advantages. By way of the squashed fiber layers in the region of the inwardly protruding bulges of the rim flanges one achieves a high stability and strength of the inventive rim. At the same time the pressure-bonding in the region of the rim flanges achieves a high surface quality and high reproducibility of the surface shape.

It is a considerable advantage that no cutting finishing steps for the inventive rim are required after removal from the production mold. At the most, burrs require trimming which have formed for example at the joint lines of the production mold parts. However, no cutting is required but at the most, deburring. The process steps required are reduced so as to decrease production expenses.

A rim according to the invention is in particular suitable for employing wire tires or else for employing bead tires in which the tire bead is accommodated in the bulges of the rim flanges. The two inwardly protruding bulges form an undercut at the rim flange to securely receive the tire.

In a preferred embodiment of the invention the rim body comprises a rim well joined with the rim base through the rim flanks, all of which form a hollow rim. The rim well is provided to be radially farther outwardly than is the rim base. In embodiments of said configuration it is possible to additionally provide at least one transverse web between the rim well and the rim base to enhance the lateral stability.

Preferably the entire rim body substantially consists of at least one fibrous composite material. Otherwise it is conceivable to employ two different fibrous composite materials combined in which similar or different reinforcing fibers and like or different matrix materials are employed.

In a particularly preferred more specific embodiment of the invention the rim body consists of at least two rim parts joined to one another. Preferably the two rim parts are at least substantially configured symmetrical relative to one another.

The two rim parts are in particular configured substantially identical and preferably produced in matching production molds. Such a configuration offers considerable advantages since the same mold can be used for producing the individual parts. Where a produced part does not meet quality requirements, only said part is non-usable but not the entire rim such that the reject rate decreases.

Preferably each of the two rim parts comprises a rim flank with a rim flange, forming part of the rim base and in particular also of the rim well when hollow rims are produced.

For producing the rim preferably precisely two rim parts are axially joined to one another.

It is particularly preferred for the rim to consist of two rim halves which are produced separately and then joined to one another.

To join and secure the two rim parts, a strip of fibrous composite material is preferably applied on the radially inwardly wall of the rim base. Alternatively or supplementarily, at least one strip of a fibrous composite material is preferably applied on the radially outwardly wall of the rim base or the rim well to secure the two axial rim parts to one another.

In all of the embodiments the rim body is at least in part and preferably entirely produced of prepregs comprising fiber layers embedded in a composite material. Preferably the fiber layers consist of a fiber fabric at least in part since fabrics have a high stability.

All of the embodiments preferably provide for at least some of the fiber layers to terminate in the region of the rim flanges. For example if strips of a fibrous composite material are employed in production, the strips are preferably inserted into the production mold such that at least one lateral end or one lateral edge is provided in the region of the rim flanges. Such an arrangement allows a simple, precise positioning of the strips in the production mold, furthermore allowing precise squashing and pressure-bonding of the fiber layers in the region of the rim flanges.

In another embodiment it is preferred for at least one rim flange to consist at least in part of at least one fabric hose which is impregnated with a compound material such as a resin before or after positioning in the mold. In the region of the rim flange the fabric hose layers are stacked upon each other and pressure-bonded.

More specific embodiments of the invention provide in the region of the rim flanks and in particular in the region of the rim flanges a layer comprising e.g. ceramic particles to provide a portion of and in particular the entire brake-contact surfaces with ceramic particles to enhance the braking action.

In another configuration at least one spoke hole reinforcing layer is provided which reinforces the rim base in the region of the spoke holes. In the case of a two-part rim, corresponding narrower reinforcing layers are preferably provided in the region of the rim base.

Additionally to a specific brake layer or else instead of a brake layer, a tread wear indicator may be provided which is in particular configured as a tread wear indicator layer at the rim flanks. To this end, tread wear indicators may be provided distributed at periodic intervals over the circumference which are usually covered in a cover layer and become visible as wear progresses so as to indicate an impending loss of stability of the rim. It is also conceivable to incorporate at least one tread wear indicator in the rim flanks.

Furthermore the invention is directed at a method for producing a rim in particular for bicycles by means of which a rim having a rim body can be produced, the rim body comprising a rim base and lateral rim flanks provided with rim flanges. Production occurs in such a way that at least the rim flanges consist at least in part of a fibrous composite material of at least one fiber layer. According to the invention the fiber layers are squashed in the region of the rim flanges to form bulges overhanging inwardly between which a tire can be accommodated at the rim body.

The method according to the invention also offers many advantages. By way of squashing the fiber layers in the region of the rim flanges, subsequent machining is eliminated. The pressure applied leads to a high surface quality. By means of pressure-bonding the fiber layers are squashed in the region of the rim flanges wherein the shape predetermined by the master mold is obtained. A high surface quality is achieved.

In a more specific embodiment of the inventive method for producing a rim the finished rim body comprises a rim well joined to the rim base through the rim flanks to thus produce a hollow rim.

In more specific embodiments a laminated band is first positioned in a master mold comprising at least one strip of at least one fiber layer to form at least part of the rim base and a rim flank and a rim flange.

Subsequently a core or inflatable tube is positioned on the laminated band in the master mold. Alternatively the core may be e.g. wrapped in the laminated band external of the master mold. Preferably, however, the laminated band is firstly inserted into the master mold since this allows precise positioning of the laminated band in the master mold. Subsequently the core or inflatable tube is applied on the laminated band.

To close the master mold, an outer ring is applied which in closing squashes and pressure-bonds the material in the region of at least the upper rim flanks and in particular of the rim flanges and thus allows a precise shaping of the rim flanges.

Thereafter the master mold is heated up and temperature-controlled for a predetermined duration at predetermined temperature conditions. Thereafter the rim is removed wherein the pressure-bonding and squashing of the fiber layers in the region of the rim flanges eliminates the need for machining since a high surface quality and the desired shape are obtained. Any overhanging burrs can be removed easily.

To produce the laminated band, in particular multiple strips of the fiber-layers-including fibrous composite material are stacked upon each other in a defined pattern on a separate support to form the laminated band. Thereafter the laminated band is preferably re-shaped to form a V-shaped laminated band to facilitate positioning in the master mold. When positioning the V-shaped laminated band along the periphery of the inner part of a master mold the laminated band is precisely aligned with the respective edges. Such structuring of the laminated band of precisely defined strips at precisely defined length and width allows precise production at high reproducibility.

For producing, another laminated band may additionally be employed which is formed by positioning on the separate support at least a second quantity of strips of a fiber-layers comprising material. Said second quantity of strips of fiber layers may have a second shape different from the shape of the strips for the first laminated band. It is also possible for individual strips of the first laminated band and the further laminated band to differ in shape from one another such that the laminated band positioned first may for example consist of strips of different widths and/or shapes. It is possible for each laminated band to consist of one strip or one fiber layer only.

An inflatable tube may be applied on the first laminated band positioned in the master mold which tube is inflated to give the laminated band layers the intended shape. After production, the inflatable tube may be removed. Said inflatable tube may e.g. be pulled out through the valve hole.

Also, a core may be positioned which may consist of a eutectic metal. This allows that the metal which is solid when placed in the mold, will later melt in the master mold as the production mold is tempered for curing and reticulation of the fibrous composite material and subsequently said metal can be removed out of the interior of the rim for example through the valve hole of the rim for recycling.

In other configurations the core may be a fluid which in turn is enveloped in a hose. The fluid may for example be water or oil and a pressure-compensating valve may be connected with the core to equalize the pressure rise during heating up.

Other embodiments may provide for employing a core of a foamed plastic or the like which is flushed out by means of a solvent or remains in the mold.

In a more specific embodiment of the method the fiber layers are squashed and reshaped in the region of the rim flanges in the master mold by means of at least one radially inwardly web of the outer ring to thus give the rim flanges their final shape. Such a configuration offers particular advantages since as the outer ring is closed, the fiber layers are squashed in the region of the rim flanges. The firm, non-deformable webs result in a precisely defined shaping of the rim flanges.

In particularly preferred configurations the master mold consists of two halves which are joined to one another in particular before the first or only laminated band is inserted. It is possible that the parts of the master mold are first joined and subsequently a release agent is applied on the shaping surface to prevent the fibrous composite material from adhering to the master mold.

In a preferred specific embodiment two rim parts are produced each of which forms a rim flank with a rim flange and part of the rim base. In preferred configurations two identical rim parts are produced which after producing the two rim parts are axially joined to one another. For this purpose for example an additional strip of the fibrous composite material may be positioned on the rim bases and/or the rim flanks of the abutting rim parts to join the two rim parts to one another.

In the region of the rim base the joining layer may serve as a reinforcement for the rim base. Other joining techniques are also conceivable.

Another joining layer may be applied on the rim well to join the two rim parts to one another.

Preferred more specific embodiments provide that before the outer ring is applied, any radially overhanging material is removed to allow optimal squashing and pressure-bonding.

Preferably the mold is coated in a layer comprising ceramic particles in a radially outwardly region of the shaping surface to provide at least part of the rim flanks serving as brake-contact surfaces with a brake layer of ceramic particles.

In other configurations a strip comprising ceramic particles is applied on the laminated band in a suitable place to reinforce the region of the brake-contact surface of the rim flanks.

It is also conceivable to insert a spoke hole reinforcing layer in the region of the rim base.

In another preferred configuration a tread wear indicator layer is employed at the rim flanks to indicate in good time the impending wear of the rim.

In all of the configurations the matrix material may consist at least in part of a thermosetting matrix material. It is also possible to employ a thermoplastic matrix material.

BRIEF DESCRIPTION OF THE DRAWINGS

Further advantages and features can be taken from the exemplary embodiments described below with reference to the enclosed Figures.

FIG. 4 is one half of another inventive rim in section;

FIG. 5 is a schematic illustration of the fiber layers for producing the rim according to the invention as in FIG. 4;

DETAILED DESCRIPTION

Figure 1:
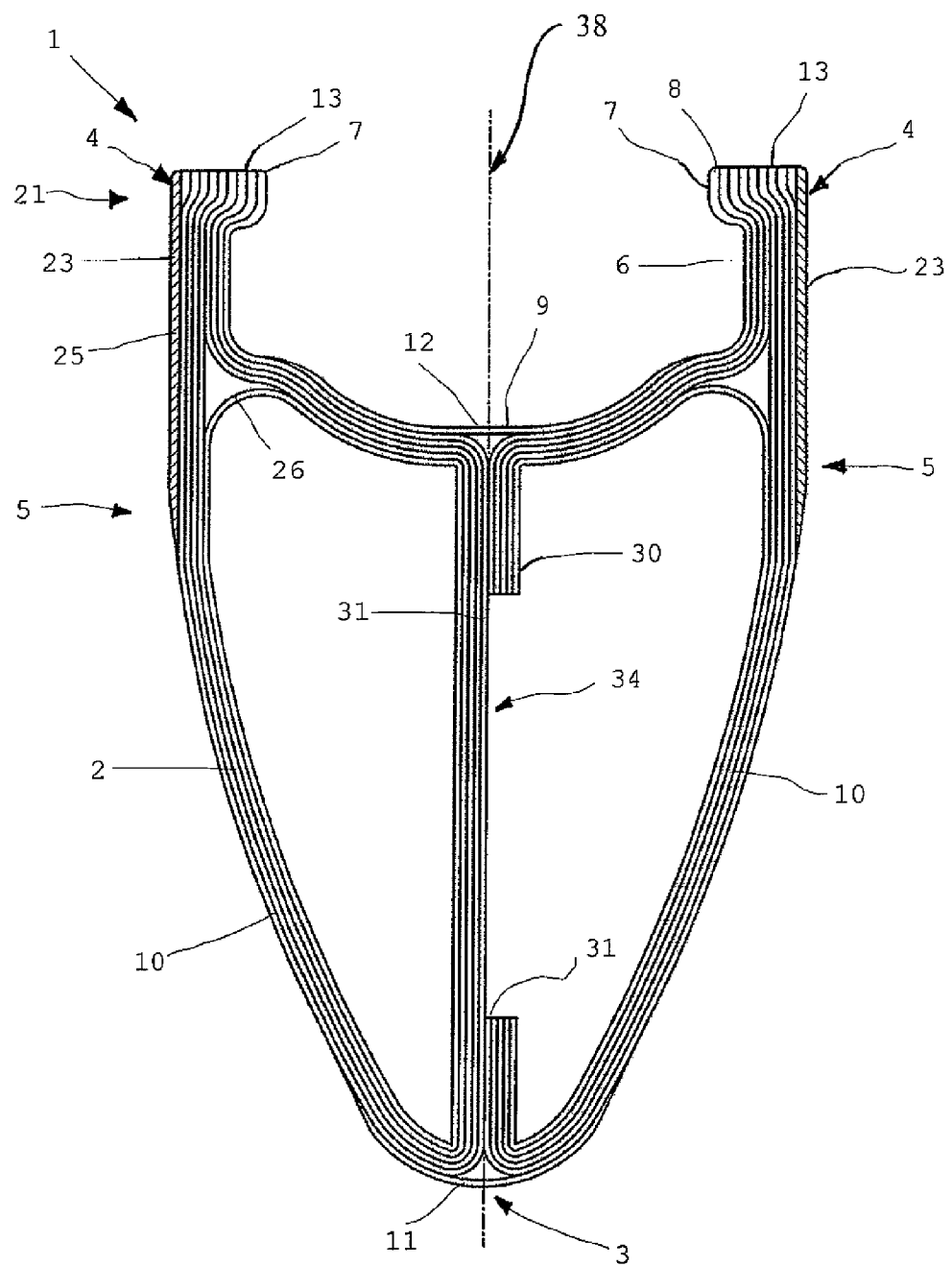
FIG. 1 is an inventive rim in section.

FIG. 1 illustrates a first embodiment of a rim 1 according to the invention in cross-section. The rim 1, entirely produced of a fibrous composite material, substantially consists of two halves or rim parts 10 which in the present embodiment are configured to be symmetrical and identical relative to a radial plane 38.

Each rim part 10 comprises a rim flank 5 with the rim flange 4 provided on it, part of the rim well 9 and, in the radially inwardly region of the rim flank 5, part of the rim base 3.

Each rim part 10 is produced separately wherein in the present embodiment includes identical molds that are employed for producing the rim. Each rim part 10 is formed as an at least substantially closed annular body and to complete the rim, the two rim parts 10 are bonded to one another wherein a web 30 forms from the walls 31 in contact with one another.

To reduce the weight of the entire rim, openings or recesses 34 may be made in the walls 31 before joining the two rim parts 10, by routing or the like in particular in a number of places symmetrically distributed over the periphery to thus partially reduce the wall thickness of the web 30. Or else it is conceivable for the layers used in production to already comprise corresponding recesses 34.

The entire rim 1 consists of a number of fiber layers 6 which are embedded in a matrix material. For producing the rim 1, prepregs are preferably used, i.e. fiber mats impregnated in a resin. Or else it is possible to employ non-impregnated fiber mats which are draped in the mold and subsequently coated in a resin or provided with a resin in another way.

Figure 10:
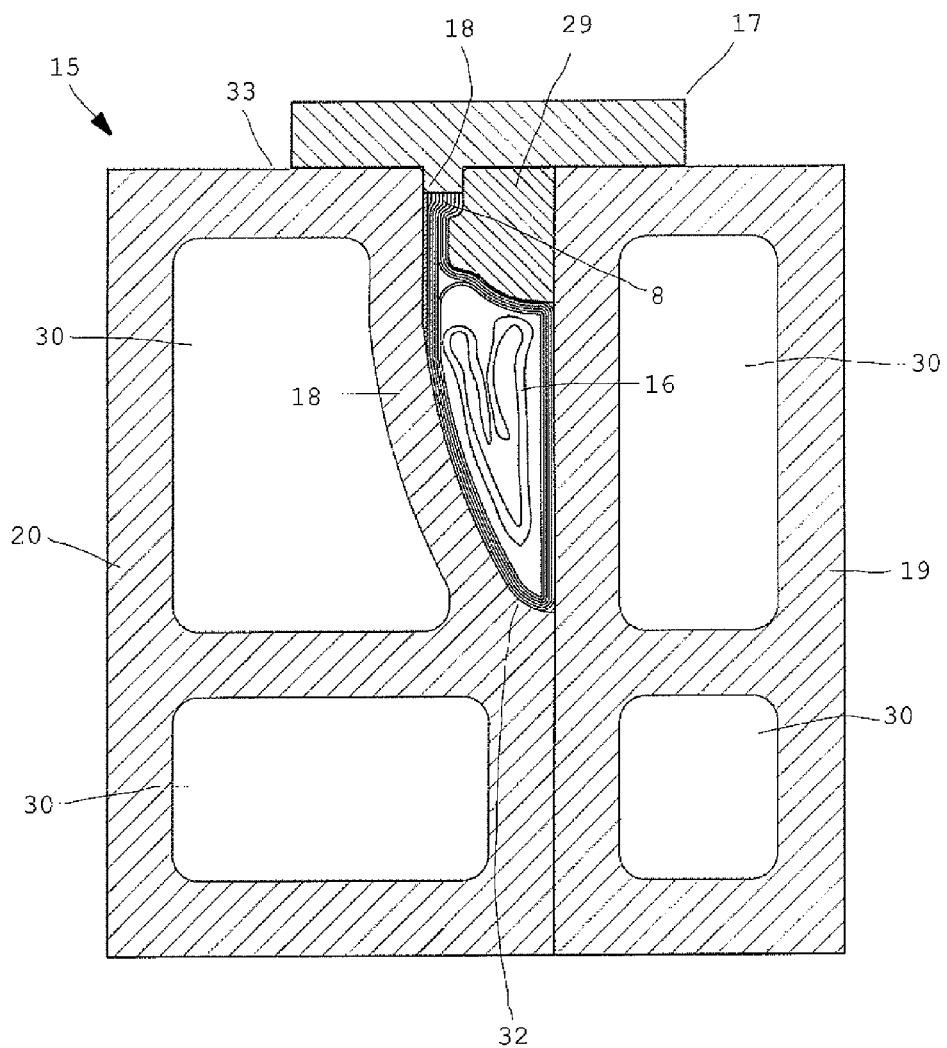
FIG. 10 is a schematic illustration of a production mold.

The basic production of an inventive rim 1 is performed by means of a mold such as a master mold 15 which consists of two halves 19 and 20 and which is in particular made of metal. Such a master mold 15 is illustrated in FIG. 10.

In the two halves of the master mold 15, heating and cooling channels 30 are provided to allow a fluid and in particular water to stream through the master mold 15 to quickly bring it to the desired curing temperature and to quickly cool the master mold 15 down after curing. This method allows heating up and cooling down the master mold in a matter of minutes while heating up and cooling down by way of convection in indoor air takes considerably longer any may even take hours. This allows to considerably accelerate the production process such that by using the same master mold 15, considerably more rim parts 10 and thus rims 1 can be produced in a day.

To produce a rim part 10, the two halves 19 and 20 of the master mold 15 are screwed to one another. The shaping surface is in particular provided with a non-stick layer to prevent the fiber layers 6 of the rim part 10 from adhering.

In a parallel process a laminated band 14 is formed (see e.g. FIG. 3), wherein each fiber layer 6 impregnated with the matrix material is cut to size on a level surface and stacked on top of one another in a defined pattern. A predetermined quantity of fiber layers in the form of strips is stacked upon each other to form the laminated band 14. It is possible to use fiber layers 6, 25 of different widths and/or lengths. Suitable markings on the support ensure that each rim part 10 is produced reproducibly and identically.

The laminated band 14 is in particular re-shaped into a V-shape and positioned on the shaping surface 32 of the master mold 15 and suitably draped. The lateral ends 13 or edges of the laminated band 14 are aligned to lie parallel in the upper region or in the radially outer region of the master mold.

Figure 2:
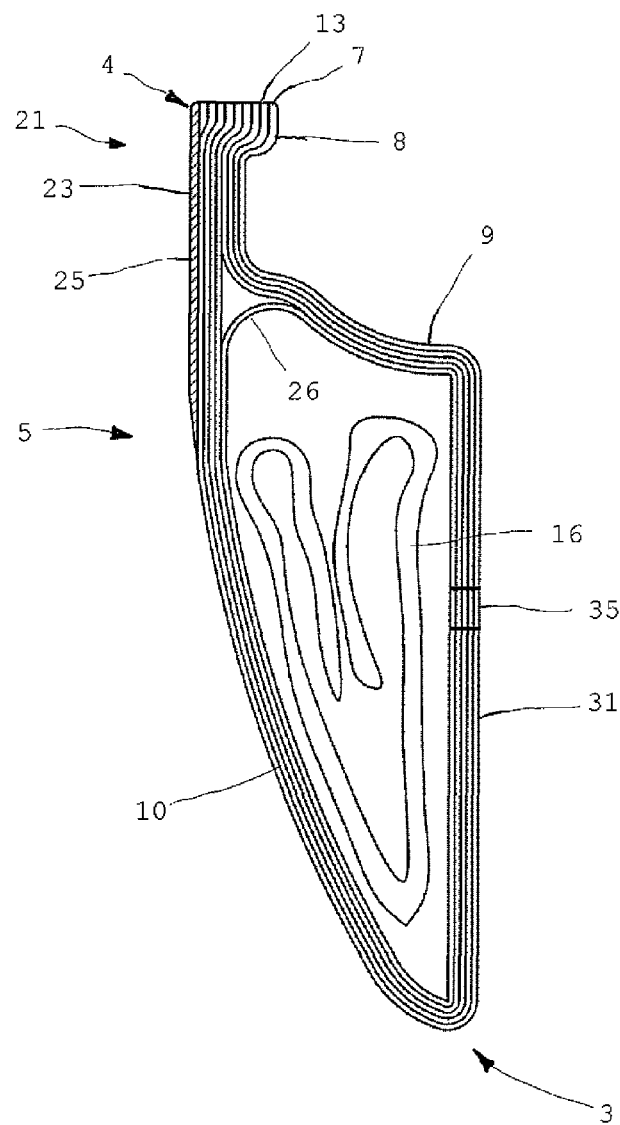
FIG. 2 is one half of another inventive rim in section.

After inserting the laminated band 14, which e.g. consists of the fiber layers 6, an inflatable tube 16 is positioned in the master mold 15 on the inserted fiber layers such that the inflatable tube 16 extends in a ring in the master mold 15. A tube valve, not shown, leads outwardly through an opening in the master mold 15 (not shown in FIG. 1) for inflating and pressurizing the inflatable tube after closing the master mold 15. FIG. 2 indicates such an opening 35.

After inserting the inflatable tube 16 the ring-shaped mold part 29 is positioned on the outer fiber layers 6. At this time the ends 13 of the fiber layers 6, which will form the rim flange 4, are still approximately flush with the surface 33 of the master mold 15 or may protrude from it.

The mold part 29 may be configured as a solid ring which may for example also be positioned in the half 20 of the master mold 15 after positioning the fiber layers 6 and before the second half 19 closes the master mold 15.

However, it is preferred for the mold part 29 to be configured as a multi-part or slotted ring which is inserted in the master mold 15 after the halves 19 and 20 have been screwed together and the fiber layers 6 positioned.

After positioning the mold part 29 any fiber ends overhanging outwardly beyond the surface 33 may be trimmed such that the outer fiber layers are flush with the surface 33.

Thereafter the outer ring 17 which comprises a radially inwardly extending web 18 is applied on the master mold. The web 18 is employed for pressure-bonding and squashing the radially outwardly fiber layers 6 so as to generate the inwardly extending bulges 7. When pressure-bonding the individual fiber layers the ends of the individual fiber layers may interlock, thus forming a firm, high stability compound.

The pressure applied by means of the web 18 of the outer ring 17 shapes the extreme ends 13 of the fiber layers 6 so as to eliminate the need for any shaping refinishing of the rim flanges. Sprouting burrs are trimmed after removing the rim part 10 from the master mold 15. No machining is required.

Before or after closing the master mold 15 by means of the outer ring 17 the inflatable tube 16 is inflated and pressurized to a predetermined level for the rim profile to contact the shaping surface 32 of the master mold 15 as desired.

After heating up and curing the rim part 10, a cooling liquid is applied to the master mold 15 in the channels 30 for the master mold 15 to cool down quickly. After removing the rim part 10 the master mold may be used to produce another rim part 10.

To complete the rim 1 the two rim parts 10 are joined to form a rim body 2 to which end adhesive coating may be applied on the axial walls 31 which are thus joined to form a web 30. A fiber layer in the shape of a strip 11 may be applied radially inwardly at the rim well 3 to join the rim parts 10 to one another there. The strip 11 may extend over the width of the rim base 3 but it may reach farther upwardly on the rim flanks 5.

A strip 12 of a fiber layer provided with a matrix material is preferably applied also in the region of the rim well 9 to thus reliably join the two rim parts 10 to form a rim 1.

On the whole, a rim 1 is produced in which squashed fiber layers 8 are provided at the rim flanges 4 to produce the inwardly extending bulges 7. The fiber layers 8 in the bulges 7 are arranged parallel to the radial plane 38.

In the region of the rim flanks 5 and up to the rim flanges 5, a brake-contact surface 23 may be provided which may have a separate brake layer 25 comprising for example ceramic particles to enhance the braking action. It is also conceivable to provide a tread wear indicator layer on the brake-contact surface 23 so as to inform the user of an impending wear. The tread wear indicator layer or the specific brake layer 25 is in particular provided in a top region 21.

Figure 3:
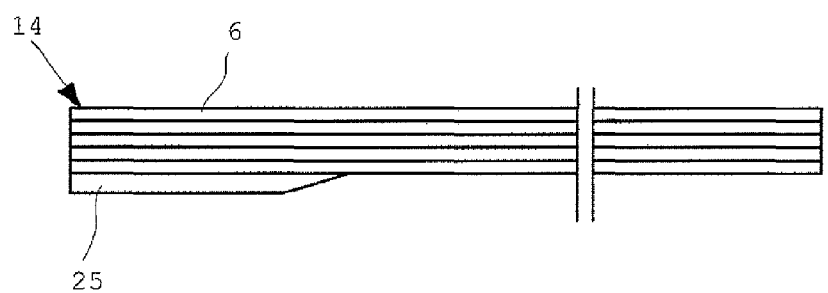
FIG. 3 is a schematic illustration of the fiber layers for producing the rim according to the invention as in FIG. 2.

The FIGS. 2 and 3 illustrate a modified version of a rim part 10 for producing a rim 1 according to the invention. FIG. 2 shows a cross-section of the rim part 10, which rim part 10 comprises a rim flange 4 having a bulge 7 of squashed fiber layers 8. There is furthermore formed at the rim part 10 a rim flank 5 and part of the rim base 3.

Inwardly of the rim part 10 an inflatable tube 16 is arranged which after production of the rim part 10 can be removed through an opening 35 for example in the wall 31.

As in the embodiment in FIG. 1, the rim part 10 in FIG. 2 comprises an annular layer 26 extending entirely around the inflatable tube 16. A fiber layer 6 is folded back above the inflatable tube 16. Or else it is conceivable to insert a hose fabric 26.

FIG. 3 shows the laminated band 14 in a transverse view with the individual layers 6 of the laminated band 14 stacked upon each other. One can recognize that the brake layer 25 does not extend over the entire width of the fiber layers but only in a region 21 extending over the rim flange and part of the rim flank 5. The quantity of the stacked fiber layers 6 for forming the laminated band is determined by the specific application. It is conceivable to employ less or more than the five fiber layers 6 illustrated in FIG. 3 for producing the rim part 10.

To produce the rim part 10 illustrated in FIG. 4 a laminated band 14' is employed as schematically illustrated in FIG. 5. Differently from the embodiment in FIG. 2, no annular layer 26 is employed for the rim part 10 in FIG. 4. Furthermore the rim flank 5 is reinforced by a reinforcing layer 27 extending from the region of the rim flange 4 until the rim base 3, thus reinforcing the rim flank 5 and the rim flange 4 while the web 31 and the rim well 9 are not unnecessarily reinforced. A separate brake layer 25 is dispensed with presently.

Figure 6:
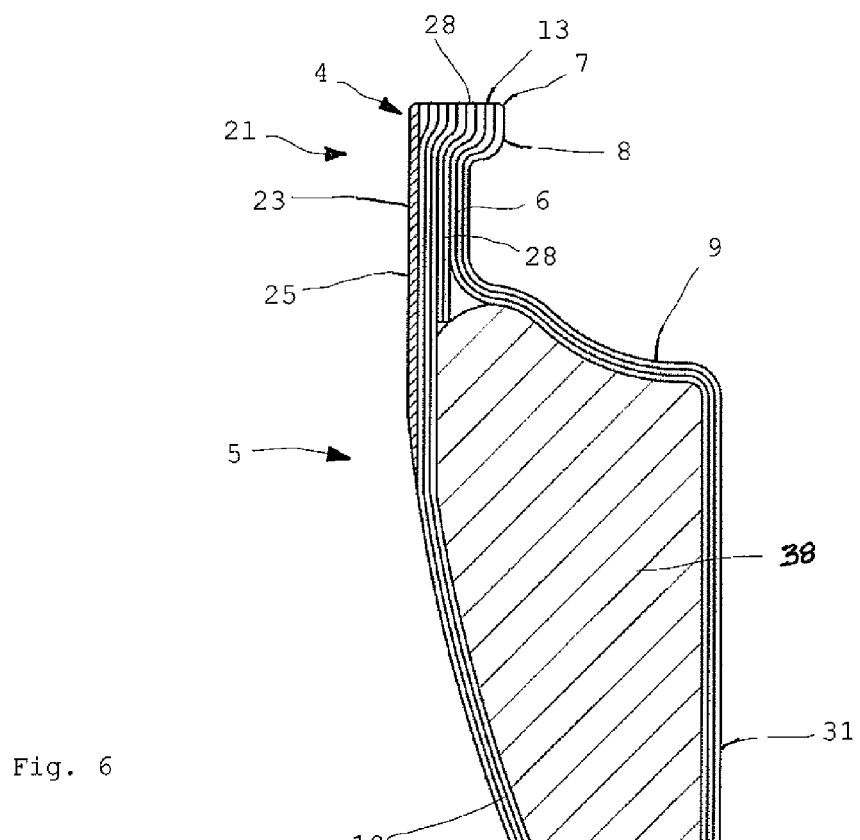
FIG. 6 is one half of another inventive rim in section.
Figure 7:
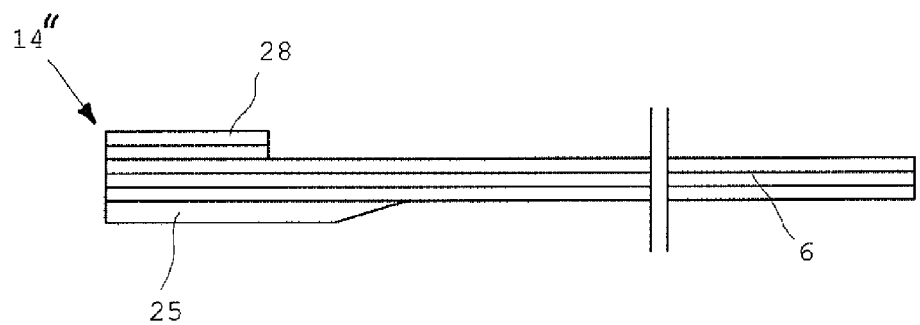
FIG. 7 is a schematic illustration of the fiber layers for producing the rim according to the invention as in FIG. 6.

For the rim part 10 illustrated in FIG. 6 a laminated band 14" is employed as illustrated in FIG. 7. It is assumed that in the region of the rim flange a relatively large quantity of material is required which is why in the region of the rim flange 4 two additional rim flange layers 28 are provided which are narrow strips and are positioned on the fiber layers 6.

In addition a brake layer 25 may be provided. This configuration of the laminated band results in that in the region of the rim flange 4 relatively much material is available for forming the squashed fiber layers 8. It is also conceivable to employ only one additional rim flange layer 28 or a number of rim flange layers 28. Presently, a core 38 is used which may consist e.g. of a shaped rigid foam and which is placed in the mold instead of an inflatable tube 16 to thus provide the intended shaping. After producing, the core 38 may remain in the rim or it may be flushed out e.g. by means of a solvent.

It is also conceivable and preferred to use a core 38 of a eutectic metal which is flushed out of the rim part 10 after heating up to the melting temperature to be recycled.

It is also conceivable to use a bag filled with a fluid in connection with the ambience e.g. through a pressure-compensating valve to equalize the pressure in the increasing temperatures during heating.

Figures 8, 9:
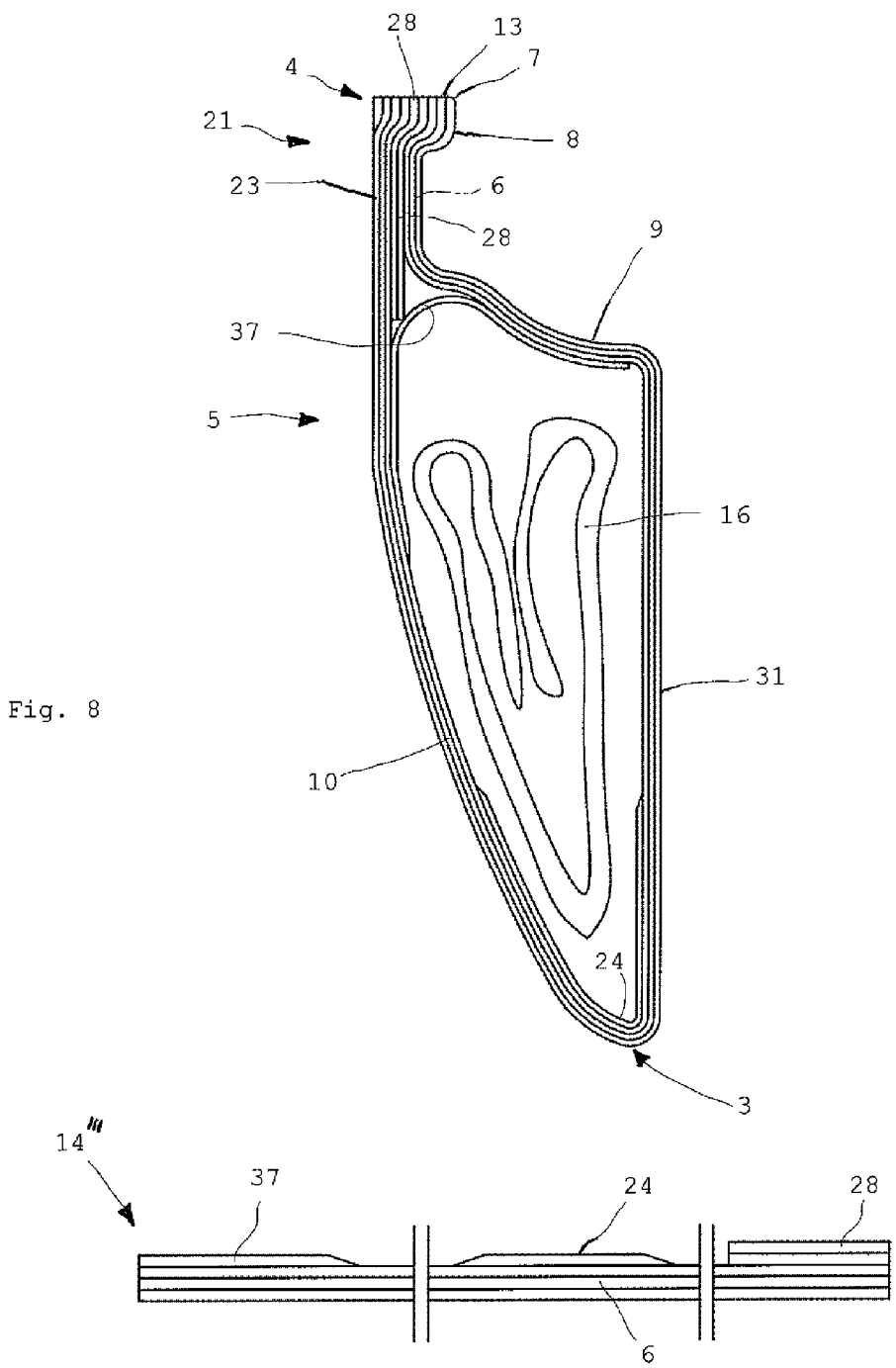
FIG. 8 is another half of another inventive rim in section.
FIG. 9 is a schematic illustration of the fiber layers for producing the rim according to the invention as in FIG. 8.

FIG. 9 shows another embodiment of a rim part 10 for producing a rim 1 according to the invention. A laminated band 14''' is employed as shown in FIG. 8.

To form the laminated band 14, two rim flange layers 28 of a narrow width are positioned on the fiber layers 6 at the end 13 while in a central region a rim base reinforcing layer or spoke hole reinforcing layer 24 is applied. In this way one achieves that on the one hand the region of the rim flange 4 is provided with sufficient material for generating adequate stability while on the other hand also providing reinforcement for the rim base 3 which must absorb the loads of the spokes. While the rim flange layers 28 are positioned on what is the right-side edge of the laminated band 14''' in FIG. 9 and the rim base reinforcing layer or spoke hole reinforcing layer 24, on a center region; narrower layers 37 are positioned on what is the left-side edge of the laminated band in FIG. 9, which layers are folded back after positioning in the mold and after positioning a firm core 38 or inflatable tube 16 to reinforce the rim well and to transfer the forces generated.

The entire invention provides a method of producing a rim, and a rim which by way of the squashed rim layers 8 forms bulges 7 in the region of the rim flange 4 which bulges are suitable to accommodate bead tires. It is surprising that adequate stability is achieved without employing additional reinforcing rings in the region of the rim flange.

By way of the two-part rims produced of two halves or rim parts 10, a simple and efficient production is possible wherein the squashing of the rim layers 6 in the region of the rim flange 4 allows to dispense with complicated finishing operations for the rim flanges. In total, a high quality rim can be produced with relatively little work.

The invention claimed:

1. A rim for bicycles comprising: at least a rim body having a rim base and lateral rim flanks provided with rim flanges wherein at least the rim flanges consist at least in part of a fibrous composite material having at least one fiber layer, the rim flanges are formed of parallel fiber layers that are arranged parallel to a radial plane defined by said rim body and include inwardly overhanging bulges between which a tire can be accommodated at the rim body, wherein the layers have ends that are flush with a radially outermost most surface of the overhanging bulges.

2. The rim according to claim 1, wherein the rim body comprises a rim well which is joined with the rim base through the rim flanks.

3. The rim according to claim 1, wherein the rim body substantially consists of at least one fibrous composite material.

4. The rim according to claim 1 wherein the rim body consists of at least two rim parts joined to one another.

5. The rim according to claim 4, wherein the two rim parts are formed substantially symmetrically relative to one another.

6. The rim according to claim 4, wherein each of the two rim parts form a rim flank with a rim flange and part of the rim base.

7. The rim according to claim 5, wherein the two rim parts are joined to one another by means of at least one strip of a fibrous composite material.

8. The rim according to claim 1, wherein the rim body is produced of prepregs at least in part.

9. The rim according to claim 1, wherein the fiber layers consist of a fiber fabric at least in part.

10. The rim according to claim 1, wherein the ends of at least some of the fiber layers are provided in the region of the rim flanges.

11. The rim according to claim 1, wherein the rim body and in particular at least one rim flange consist of at least one fabric hose at least in part.

12. The rim according to claim 1, wherein the inwardly overhanging bulges are formed from squashed fiber layers.

* * * * *